(12) United States Patent
Weil et al.

(10) Patent No.: US 11,744,427 B2
(45) Date of Patent: Sep. 5, 2023

(54) FLOOR CLEANING MACHINE WITH SOLID CHEMICAL DELIVERY SYSTEM

(71) Applicants: Jacob T. Weil, Toledo, OH (US); Thomas J. Quagliotto, Toledo, OH (US); Kyle S. Strait, Holland, MI (US); Keith W. Kennedy, Litchfield, OH (US); Eric Calhoun, Wyandotte, MI (US)

(72) Inventors: Jacob T. Weil, Toledo, OH (US); Thomas J. Quagliotto, Toledo, OH (US); Kyle S. Strait, Holland, MI (US); Keith W. Kennedy, Litchfield, OH (US); Eric Calhoun, Wyandotte, MI (US)

(73) Assignee: Betco Corporation, Bowling Green, OH (US)

( * ) Notice: Subject to any disclaimer, the term of this patent is extended or adjusted under 35 U.S.C. 154(b) by 275 days.

(21) Appl. No.: 17/088,668

(22) Filed: Nov. 4, 2020

(65) Prior Publication Data
US 2021/0127937 A1 May 6, 2021

Related U.S. Application Data

(60) Provisional application No. 62/930,691, filed on Nov. 5, 2019.

(51) Int. Cl.
*A47L 11/40* (2006.01)
*B01D 19/02* (2006.01)
(Continued)

(52) U.S. Cl.
CPC .......... *A47L 11/4016* (2013.01); *A47L 11/28* (2013.01); *A47L 11/30* (2013.01); *A47L 11/4011* (2013.01);
(Continued)

(58) Field of Classification Search
CPC .............. A47L 11/408; A47L 11/4088; A47L 11/03201; A47L 11/4016; A47L 11/4011;
(Continued)

(56) References Cited

U.S. PATENT DOCUMENTS 2,506,077 A    5/1950  Goldsmith
4,836,229 A *  6/1989  Lakhan ............... A47L 15/4208
                                                  134/104.4
(Continued)

*Primary Examiner* — Joel D Crandall
*Assistant Examiner* — Robert F Neibaur
(74) *Attorney, Agent, or Firm* — C. Fred Charpie, III; Ward Law Office LLC

(57) ABSTRACT

A floor cleaning machine is provided. The floor cleaning machine includes a solution tank for a cleaning solution. A pre-canister sensor receives the cleaning solution and measures the concentration of any dissolved solids. A canister assembly receives a portion of the cleaning solution from the pre-canister sensor and dissolves portions of a solid chemical form into the cleaning solution thereby forming blended droplets. The canister assembly has a spray nozzle positioned vertically above the solid chemical form. A post-canister sensor receives a mixture of the cleaning solution from the pre-canister sensor and the blended droplets from the canister assembly. The post-canister sensor measures the concentration of any dissolved solids within the mixture of the cleaning solution from the pre-canister sensor and the blended droplets from the canister assembly. A comparison of the baseline and post-canister measurements outside of a desired range results in replacement of the solid chemical form.

13 Claims, 6 Drawing Sheets

(51) Int. Cl.
*A47L 11/30* (2006.01)
*A47L 11/28* (2006.01)
*B01F 21/00* (2022.01)
*B01F 21/20* (2022.01)
*B01F 101/00* (2022.01)

(52) U.S. Cl.
CPC ....... *A47L 11/4083* (2013.01); *A47L 11/4088* (2013.01); *B01D 19/02* (2013.01); *B01F 21/402* (2022.01); *B01F 21/20* (2022.01); *B01F 2101/4505* (2022.01)

(58) Field of Classification Search
CPC ...... A47L 11/4083; A47L 11/28; A47L 11/30; A47L 11/32; A47L 11/325; A47L 15/4436; A47L 9/18; A47L 9/183; A47L 9/19; A47L 9/28–2852
USPC ...................................... 15/320, 322; 401/48
See application file for complete search history.

(56) References Cited

U.S. PATENT DOCUMENTS

| | | | |
|---|---|---|---|
| 5,134,748 A | 8/1992 | Lynn | |
| 5,411,716 A | 5/1995 | Thomas et al. | |
| 5,505,915 A | 4/1996 | Copeland et al. | |
| 5,723,019 A | 3/1998 | Krusell et al. | |
| 5,742,975 A | 4/1998 | Knowlton et al. | |
| 6,023,813 A | 2/2000 | Thatcher et al. | |
| 6,671,925 B2 | 1/2004 | Field et al. | |
| 6,735,811 B2 * | 5/2004 | Field | B01J 13/0095 15/353 |
| 6,763,860 B2 | 7/2004 | Jungmann et al. | |
| 6,857,162 B1 | 2/2005 | Rasmussen | |
| 7,051,399 B2 | 5/2006 | Field et al. | |
| 7,055,559 B2 * | 6/2006 | Reinsch | G01G 13/18 141/192 |
| 7,237,299 B2 * | 7/2007 | Tondra | A47L 11/4088 15/319 |
| 7,640,622 B2 | 1/2010 | Vankouwenberg | |
| 7,827,645 B2 | 11/2010 | Ekland et al. | |
| 8,008,082 B2 * | 8/2011 | Howland | B01F 33/812 422/403 |
| 9,061,323 B2 * | 6/2015 | Field | A47L 11/4083 |
| 9,138,693 B2 * | 9/2015 | Aouad | B01F 35/832 |
| 10,578,634 B2 * | 3/2020 | Lehtonen | G01N 35/1016 |
| 10,813,522 B2 * | 10/2020 | Reccanello | A47L 11/30 |
| 2005/0102788 A1 | 5/2005 | Pritts | |
| 2005/0178410 A1 | 8/2005 | Levy | |
| 2006/0102206 A1 | 5/2006 | Wood et al. | |

\* cited by examiner

FLOOR CLEANING MACHINE WITH SOLID CHEMICAL DELIVERY SYSTEM

RELATED APPLICATIONS

This application claims the benefit of pending U.S. Provisional Patent Application No. 62/930,691, filed Nov. 5, 2019, the disclosure of which is incorporated herein by reference in its entirety.

BACKGROUND

Floor cleaning machines are designed to clean floor surfaces. In certain instances, the floor surface can be formed from harder materials, such as the non-limiting examples of tile, wood, concrete and the like, in other instances, the floor surface can be formed from softer materials, such as the non-limiting examples of carpet and cork. When cleaning the floor surface, typically, the floor cleaning machine applies a detergent solution to an area of the floor, scrubs the floor with the detergent solution, and vacuums the dirty or spent wash water off the floor area. The floor cleaning machine can have a compartment for the clean detergent solution, and a separate compartment for the dirty detergent solution. During use, the detergent solution is progressively transferred from the clean solution compartment to the dirty or spent solution compartment.

In certain instances, the machine operator can make the detergent solution by adding a certain amount of concentrated liquid detergent to a certain quantity of clean water. The concentration of the resulting detergent solution may be rather imprecise, in that it depends merely upon the ratio of concentrate detergent solution to water. If too little detergent solution is added, then there may be inadequate cleaning of the floor. If too much detergent solution is added, then an undesirable residue, excessive foaming, and waste of the detergent may result.

With conventional floor cleaning machines, the concentration of the detergent solution is fixed once the solution has been made. However, the optimum detergent concentration will vary according to the type and amount of soil on the floor, the type of floor cleaning machine, the type of cleaning chemical being dispensed, the type of surface being cleaned, the temperature of the solvent, the degree of mechanical action applied to the floor being cleaned and the volume of cleaning solution being produced. In certain instances with known floor cleaning machines, the only variables available to the machine operator in adjusting the cleaning efficiency of the unit are the dispensing rate of the detergent solution, the linear velocity of the machine, and the ability to make repetitive passes over the floor area. The former variable is the rate of the detergent solution flowing onto the scrubbing brush. As a result, the machine operator's ability to control the detergent action of the floor cleaning machine is somewhat limited.

It would be advantageous if the formation of the detergent solution used by floor cleaning machines could be improved.

SUMMARY

It should be appreciated that this Summary is provided to introduce a selection of concepts in a simplified form, the concepts being further described below in the Detailed Description. This Summary is not intended to identify key features or essential features of this disclosure, nor it is intended to limit the scope of the floor cleaning machine with a solid chemical delivery system.

The above objects as well as other objects not specifically enumerated are achieved by floor cleaning machine. The floor cleaning machine includes a cleaning head configured for cleaning a floor surface. A solution tank is configured as a reservoir for a cleaning solution. A pre-canister sensor is configured to receive the cleaning solution from the solution tank and further configured to measure the concentration of any dissolved solids within the cleaning solution, thereby creating a baseline measurement. A canister assembly is configured to receive a portion of the cleaning solution from the pre-canister sensor and further configured to dissolve portions of a solid chemical form into the portion of the cleaning solution thereby forming blended droplets. The canister assembly has a spray nozzle positioned vertically above the solid chemical form. A post-canister sensor is configured to receive a mixture of a portion of the cleaning solution from the pre-canister sensor and the blended droplets from the canister assembly. The post-canister sensor is configured to measure the concentration of any dissolved solids within the mixture of a portion of the cleaning solution from the pre-canister sensor and the blended droplets from the canister assembly. A comparison of the post-canister measurement and the baseline measurement outside of a desired range results in replacement of the solid chemical form.

The above objects as well as other objects not specifically enumerated are also achieved by a floor cleaning machine. The floor cleaning machine includes a cleaning head configured for cleaning a floor surface. A solution tank is configured as a reservoir for a cleaning solution. A pre-canister sensor is configured to receive the cleaning solution from the solution tank and further configured to measure the concentration of any dissolved solids within the cleaning solution. A canister assembly is configured to receive a portion of the cleaning solution from the pre-canister sensor and further configured to dissolve portions of a solid chemical form into the portion of the cleaning solution thereby forming blended droplets, the canister assembly having a spray nozzle positioned vertically above the solid chemical form. A post-canister sensor is configured to receive a mixture of a portion of the cleaning solution from the pre-canister sensor and the blended droplets from the canister assembly, the post-canister sensor configured to measure the concentration of any dissolved solids within the mixture of a portion of the cleaning solution from the pre-canister sensor and the blended droplets from the canister assembly. A controller is configured to receive the measurement of the concentration of any dissolved solids within the cleaning solution from the pre-canister sensor and further configured to receive the measurement the concentration of any dissolved solids within the mixture of a portion of the cleaning solution from the pre-canister sensor and the blended droplets from the canister assembly from the post-canister sensor, and wherein the controller is configured to provide notification if a difference in the measurements is outside of a predefined range.

The above objects as well as other objects not specifically enumerated are also achieved by a method of operating a floor cleaning machine. The method includes the steps of measuring a concentration of dissolved solids within a cleaning solution configured for cleaning a floor surface with a pre-canister sensor, dissolving portions of a solid chemical form into a portion of the cleaning solution flowing from the pre-canister sensor thereby forming blended droplets, the canister assembly having a spray nozzle positioned vertically above the solid chemical form, combining the blended droplets with another portion of the cleaning solution thereby forming a mixture of the blended droplets and the cleaning solution, measuring the concentration of dissolved solids within the mixture of a portion of the cleaning solution from the pre-canister sensor and the blended droplets from the canister assembly with a post-canister sensor, comparing the measurements from the pre-canister and post-canister sensors and replacing the solid chemical form as a result of a comparison outside a desired range.

Various objects and advantages of the floor cleaning machine with a solid chemical delivery system will become apparent to those skilled in the art from the following Detailed Description, when read in light of the accompanying drawings.

DETAILED DESCRIPTION

The floor cleaning machine with a solid chemical delivery system (hereafter "floor cleaning machine") will now be described with occasional reference to specific embodiments. The floor cleaning machine may, however, be embodied in different forms and should not be construed as limited to the embodiments set forth herein. Rather, these embodiments are provided so that this disclosure will be thorough and complete, and will fully convey the scope of the floor cleaning machine to those skilled in the art.

Unless otherwise defined, all technical and scientific terms used herein have the same meaning as commonly understood by one of ordinary skill in the art to which the floor cleaning machine belongs. The terminology used in the description of the floor cleaning machine herein is for describing particular embodiments only and is not intended to be limiting of the floor cleaning machine. As used in the description of the floor cleaning machine and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the floor cleaning machine. Notwithstanding that the numerical ranges and parameters setting forth the broad scope of the floor cleaning machine are approximations, the numerical values set forth in the specific examples are reported as precisely as possible. Any numerical values, however, inherently contain certain errors necessarily resulting from error found in their respective measurements.

The description and figures disclose a floor cleaning machine equipped with a solid chemical delivery system. The solid chemical delivery system utilizes the measured dissolution of a solid chemical form to delivery an optimal amount of cleaning material to a cleaning head. The solid chemical form is positioned within a canister assembly and is engaged by a solution mist. Dissolution of the solid chemical form forms blended droplets that are delivered to a cleaning head.

Figure 1:
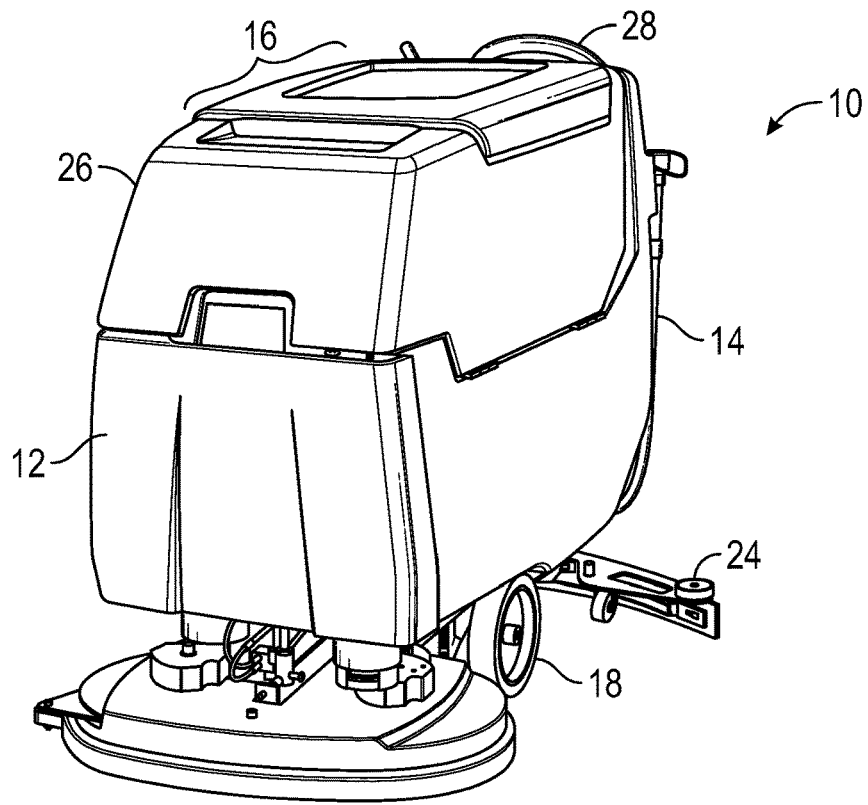
FIG. 1 is a perspective view of a floor cleaning machine in accordance with the invention.
Figure 2:
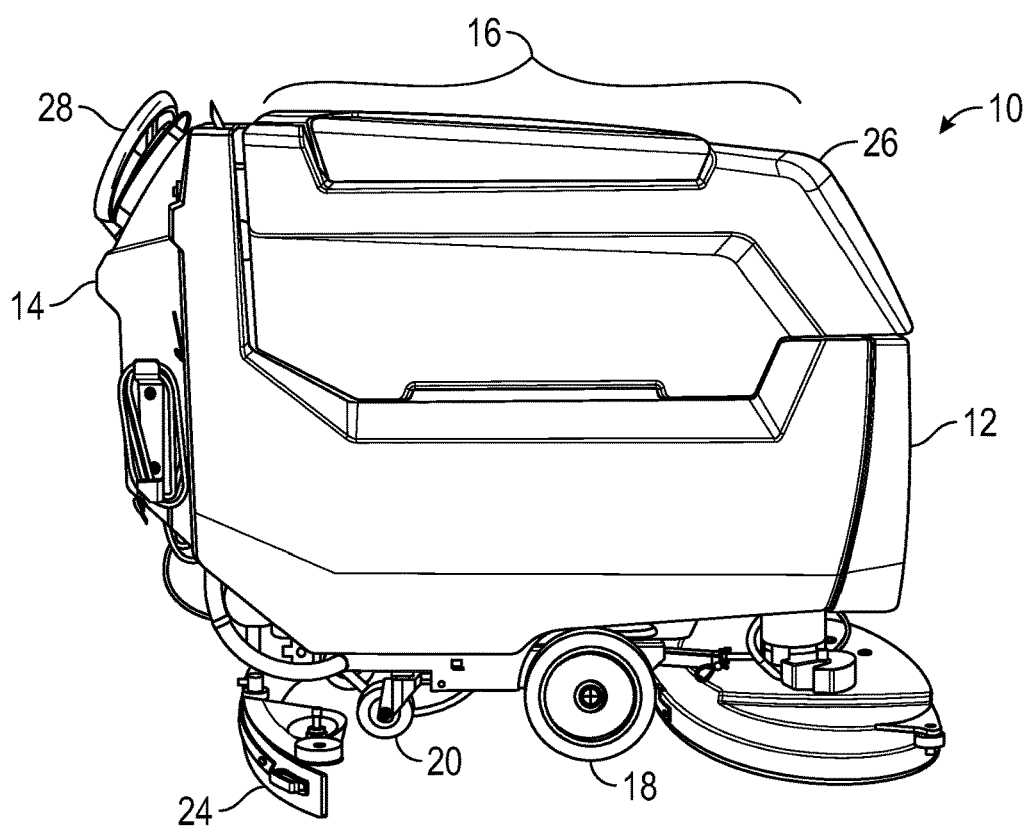
FIG. 2 is a side view of the floor cleaning machine of FIG. 1.

Referring now to the drawings, there is illustrated in FIGS. 1 and 2, a floor cleaning machine 10. In the embodiment shown in FIGS. 1 and 2, the floor cleaning machine 10 has the form of a walk-behind mid-size automatic (auto) scrubber. However, it should be appreciated that in other embodiments, that the various objects and advantages described herein can be applied to floor cleaning machine 10 having other forms, such as the non-limiting examples of a ride-on floor scrubber, steam cleaners, floor buffing machines, industrial vacuums and the like. The floor cleaning machine 10 includes a leading portion 12, a rear-ward portion 14 and a center portion 16. A plurality of drive wheels 18 are positioned in the center portion 16 and a plurality of rear support wheels 20 are positioned adjacent the rearward portion 14. A cleaning head 22 is positioned at the leading portion and a squeegee-type collection mechanism 24 is positioned at the rearward portion 14. A machine housing 26 is configured to enclose various drive mechanisms (not shown), water and chemical delivery systems (not shown) and various solution recovery apparatus (not shown) position in the leading, center and rearward portions 12, 16 and 14. An operation/control panel 28 is positioned at the rearward portion 14.

Referring again to FIGS. 1 and 2, the floor cleaning machine 10 can be used to efficiently and effectively clean floors, replacing traditional mops and buckets. The floor cleaning machine 10 operates to apply a cleaning solution to a floor surface and aggressively scrub and dry the floor surface in one pass of the floor cleaning machine. With being able to clean with only one pass, as well as the ability to clean more square footage per hour, floor cleaning machines can speed up the floor cleaning process.

Figure 3:
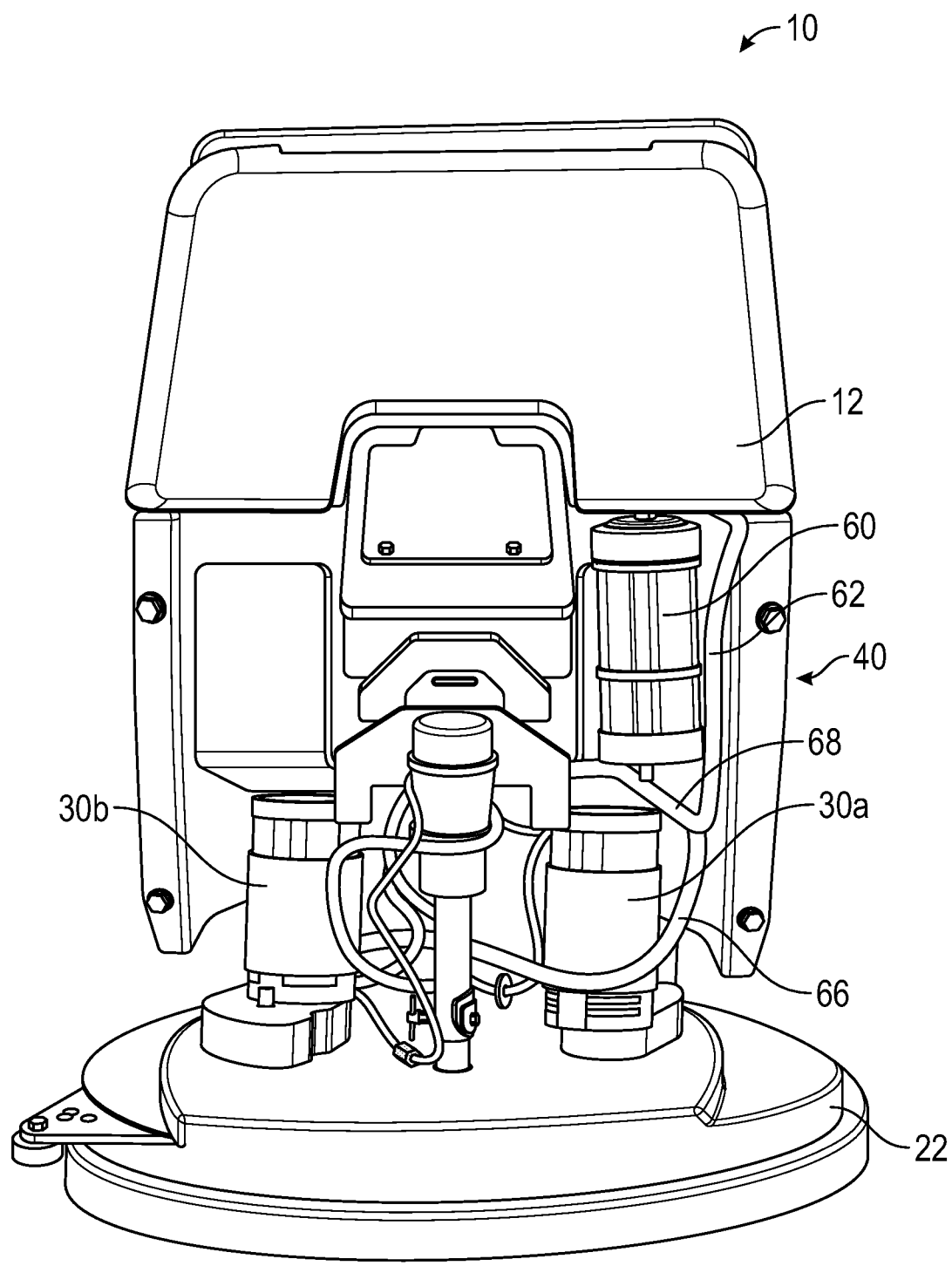
FIG. 3 is a front view of the floor cleaning machine of FIG. 1, shown with portions of a machine housing removed.

Referring now to FIG. 3, a front view of the leading portion 12 of the floor cleaning machine 10 is illustrated with a section of the machine housing 26 having been removed. The cleaning head 22 is shown including a plurality of cleaning head drive motors 30a, 30b. The floor cleaning machine 10 includes a solid chemical delivery system (hereafter "delivery system"), portions of which are shown at 40. Generally, the delivery system 40 utilizes a solution that flows over a solid chemical to provide a proportioned mixture of the solution and the chemical to the cleaning head 22.

Figure 4:
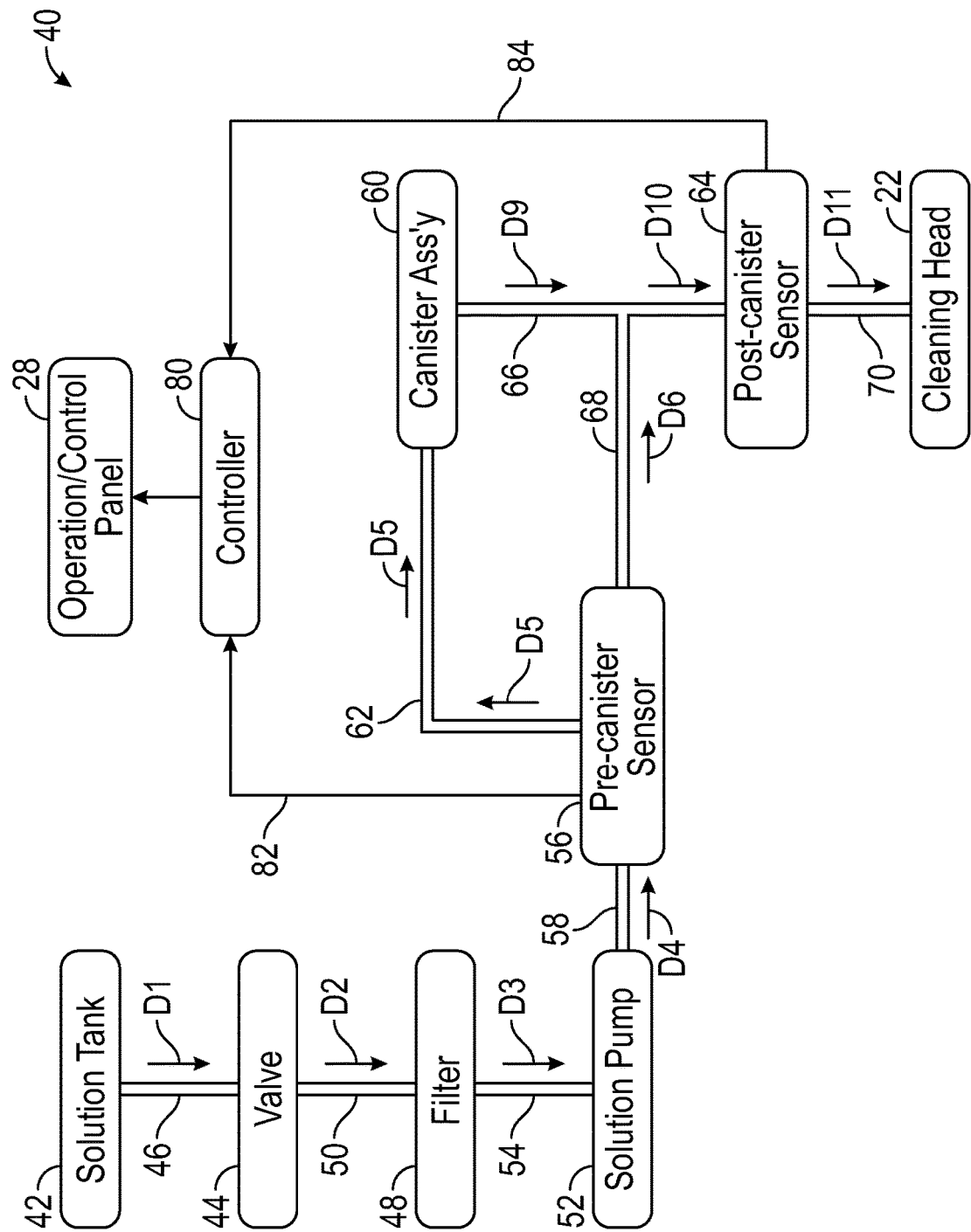
FIG. 4 is a schematic illustration of a solid chemical delivery system of the floor cleaning machine of FIG. 1.

Referring now to FIG. 4, a schematic illustration of the delivery system 40 is presented. The delivery system 40 includes a solution tank 42 fluidly connected to a valve 44 with a first hose 46. A filter 48 is fluidly connected to the valve 44 with a second hose 50. A solution pump 52 is fluidly connected to the filter 48 with a third hose 54. A pre-canister sensor 56 is fluidly connected to the solution pump 52 with a fourth hose 58. A canister assembly 60 is fluidly connected to the pre-canister sensor 56 with a fifth hose 62. A post-canister sensor 64 is fluidly connected to the canister assembly 60 with a sixth hose 66. The pre-canister sensor 56 is fluidly connected to the sixth hose 66 with a seventh hose 68. Finally, the cleaning head 22 is fluidly connected to the post-canister sensor 64 with an eighth hose 70.

Referring again to FIG. 3, the canister assembly 60, fifth hose 62 sixth hose 66 and seventh hose 68 are illustrated. The solution tank 42, valve 44, filter 46, solution pump 52, hoses 46, 50, 54, 58 and sensors 56, 64 are positioned within the machine housing 26 and are not shown for purposes of clarity.

Referring again to FIG. 4, the solution tank 42 is configured as a reservoir for a solution used by the cleaning head 22. In the illustrated embodiment, the solution is ordinary tap water. However, in other embodiments, it is contemplated that chemicals can be added to the solution to enhance the cleaning process. In the illustrated embodiment, the solution tank 42 has the form of a polymeric vessel. However, in other embodiments, the solution tank 42 can have other forms sufficient for a reservoir for a solution used by the cleaning head 22.

Referring again to FIG. 4, the valve 44 is configured to a selectively facilitate or prevent the flow of the solution from the solution tank 42 to the filter 48. In the illustrated embodiment, the valve 44 has the form of a ball-type of valve having an interior, hollow, pivoting ball to control the flow of the solution through it. In alternate embodiments, it is contemplated that the valve 44 can be any desired structure, mechanism or device sufficient to selectively facilitate or prevent the flow of the solution from the solution tank 42 to the filter 48.

Referring again to FIG. 4, the filter 48 is fluidly connected to the second hose 50 and the third hose 54 and is configured to remove contaminants from the solution and maintain solution purity in order to protect downstream components such as the solution pump 52, sensors 56, 64 and the cleaning head 22. In the illustrated embodiment, the filter 48 has the form of an inline mesh screen strainer. However, in other embodiments, the filter 48 can be any desired structure, mechanism or device sufficient to remove contaminants from the solution and maintain solution purity in order to protect downstream components.

Referring again to FIG. 4, the solution pump 52 is fluidly connected to the third hose 54 and the fourth hose 58 and is configured to receive a flow of the solution from the solution tank 42 and pump the flow of the solution to downstream components. In the illustrated embodiment, the solution pump 52 has the form of an inline water pump. However, in other embodiments, the solution pump 52 can be any desired structure, mechanism or device sufficient to receive a flow of the solution from the solution tank 42 and pump the flow of the solution to downstream components.

Referring again to FIG. 4, the pre-canister sensor 56 is fluidly connected to the fourth hose 58 and the fifth hose 62 and is configured to receive a flow of the solution from the solution pump 52. The pre-canister sensor 56 is further configured to measure the concentration of any dissolved solids within the solution, thereby establishing a baseline for downstream measurements. The term "total dissolved solids", as used herein, is defined to mean any inorganic and organic minerals, salts, metals, cations, such as the non-limiting examples of calcium, magnesium, potassium, sodium) or anions, such as the non-limiting examples of carbonates, nitrates, bicarbonates, chlorides dissolved in the solution. In the illustrated embodiment, the pre-canister sensor 56 has the form of an inline total dissolved solids (TDS)-style of sensor. However, in other embodiments, the pre-canister sensor 56 can be any desired structure, mechanism or device sufficient to receive a flow of the solution from the solution pump 52 and measure the total concentration of any dissolved solids within the solution.

Referring again to FIG. 4, the canister assembly 60 is fluidly connected to the fifth hose 62 and the sixth hose 66. The canister assembly 60 will be described in more detail below.

Referring again to FIG. 4, the post-canister sensor 64 is fluidly connected to the sixth hose 66 and the eighth hose 70 and is configured to receive a mixture of the flows from the sixth and seventh hoses 66, 68. In a manner similar to the pre-canister sensor 56, the post-canister sensor 64 is further configured to measure the total concentration of any dissolved solids within the mixed solution. In the illustrated embodiment, the post-canister sensor 64 has the same form as the pre-canister sensor 56. However, in alternate embodiments, the post-canister sensor 64 can be different from the pre-canister sensor 56.

Referring again to FIG. 4, the cleaning head 22 is fluidly connected to the eighth hose 70 and is configured to receive a flow of the mixed solution from the post-canister sensor 64. The cleaning head 22 is further configured to utilize the mixed solution to clean a floor surface, as is conventional in the art. In the illustrated embodiment, the cleaning head 22 has the form of a disk, including a plurality of cleaning brushes or pads as is known in the art. However, in other embodiments, the cleaning head 22 can be any desired structure, mechanism or device sufficient to receive a flow of the solution from the post-canister sensor 64 and utilize the mixed solution to clean a floor surface, such as the non-limiting example of an orbital cleaning head.

Referring again to FIG. 4, the hoses 46, 50, 54, 58, 62, 66, 68 and 70 are configured to convey the solution or mixtures of the solution and the dissolved solids. In the illustrated embodiment, the hoses 46, 50, 54, 58, 62, 66, 68 and 70 are formed from a polymeric thermo plastic material, such as the non-limiting example of polyvinyl chloride (PVC). However, in alternate embodiments, the hoses 46, 50, 54, 58, 62, 66, 68 and 70 can be formed from other materials sufficient to convey the solution or mixtures of the solution and the dissolved solids.

Referring now to FIGS. 3-6, the cannister assembly 60 is illustrated. The canister assembly 60 is configured for several functions. First, the canister assembly 60 is configured to receive a flow of solution through the fifth hose 62 from pre-canister sensor 56. Second, the canister assembly 60 is configured to deliver a mist of the solution to a solid chemical form in a manner such that the mist of solution engages the solid chemical form and dissolves the solid chemical form. Finally, the canister assembly 60 is configured to deliver a mixture formed solution and the dissolved solid chemical form to the sixth hose 66.

Referring again to FIGS. 3-6, the canister assembly 60 includes a canister shell 90, a canister cage 92 and a solid chemical form 94. As shown in FIG. 6, the canister assembly 60 is assembled by insertion of the solid chemical form 94 into the canister cage 92 and subsequent insertion of the canister cage 92 into the canister shell 90.

Figure 5:
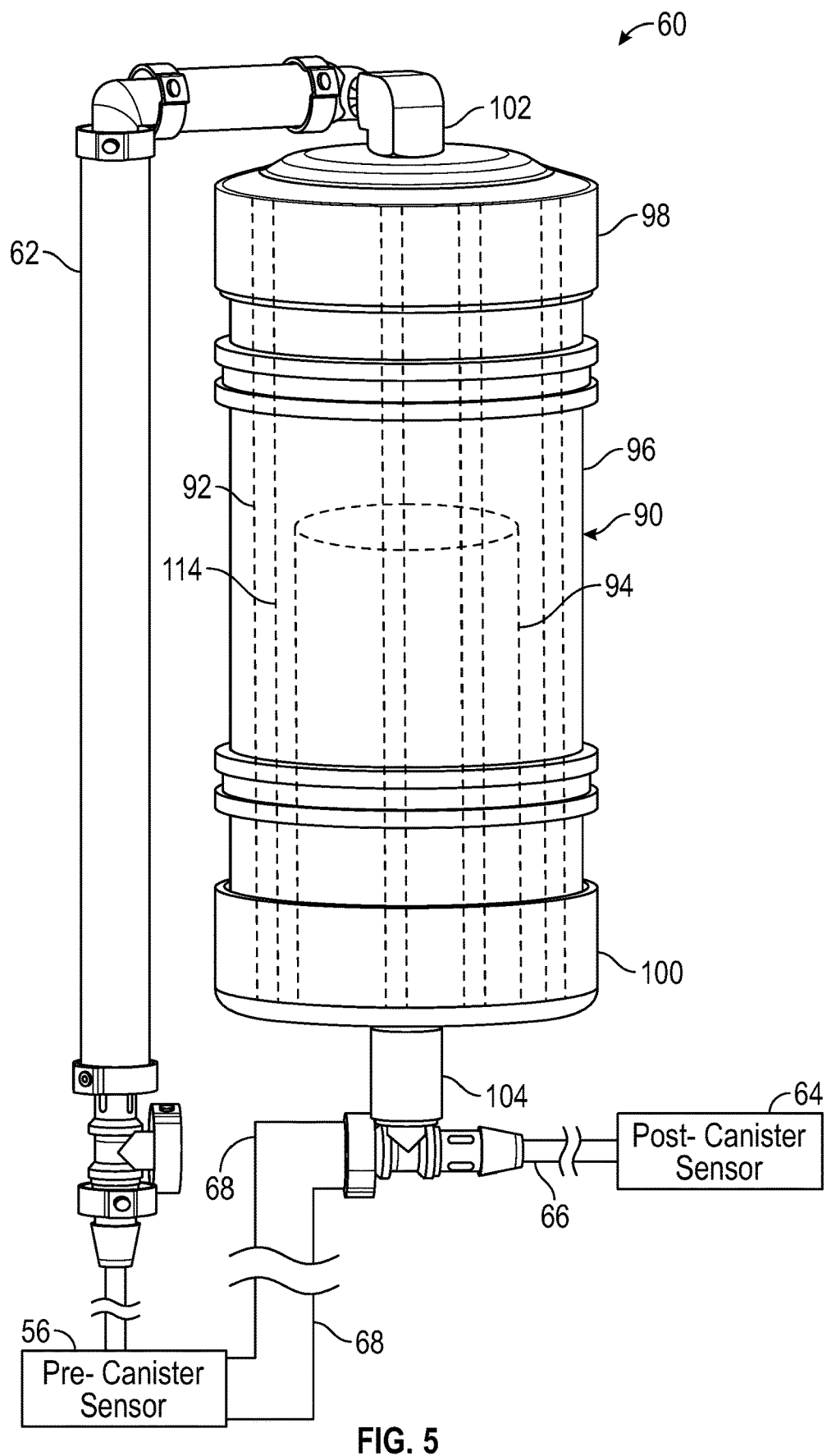
FIG. 5 is a perspective view of a canister assembly of the solid chemical delivery system of FIG. 4.
Figure 6:
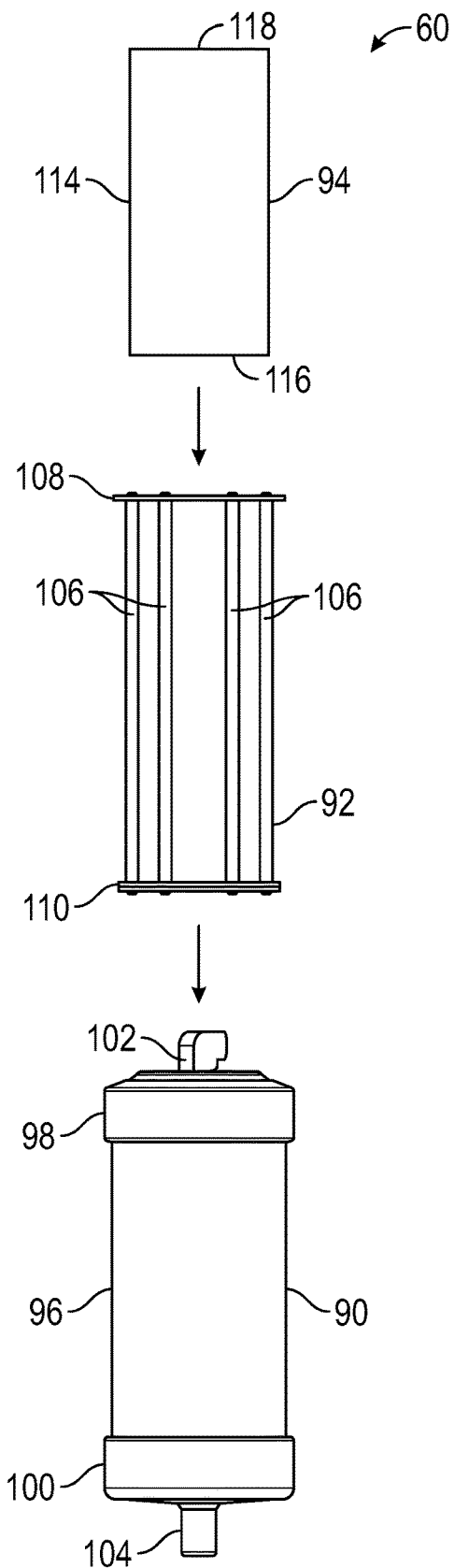
FIG. 6 is an exploded side view of the canister assembly of FIG. 5.

Referring now to FIGS. 5 and 6, the canister shell 90 includes a circumferential wall 96 bounded by an upper cap 98 and a lower cap 100. In the illustrated embodiment, the circumferential wall 96, upper and lowers caps 98, 100 are formed from a transparent, solution-proof polymeric material, thereby facilitating visual observation of the solid chemical form 94. However, in other embodiments, the circumferential wall 96, upper and lower caps 98, 100 can be formed from other solution-proof materials.

Referring again to FIGS. 5 and 6, the upper cap 98 of the canister shell 90 includes an upper port 102, configured for fluid connection with the fifth hose 62. The lower cap 100 includes a lower port 104 configured for fluid connection with the sixth hose 66. In the illustrated embodiment, the upper and lower ports 102, 104 have the form of fluid fittings. However, in other embodiments, the upper and lower ports 102, 104 can be formed from other structures, mechanisms and devices sufficient for fluid connections with the fifth and sixth hoses 62, 66 respectively.

Referring again to FIGS. 5 and 6, the canister cage 92 is configured for insertion into the canister shell 90 and is further configured to house the solid chemical form 94. The canister cage 92 includes a plurality of spaced apart columns 106 bounded by opposing upper and lower rings 108, 110. The spaced apart columns 106 and the opposing upper and lower rings 108, 110 cooperate to form a cage-like structure for housing the solid chemical form 94. In the illustrated embodiment, the spaced apart columns 106 and the opposing upper and lower rings 108, 110 are formed from solution-proof polymeric material. However, in other embodiments, the spaced apart columns 106 and the opposing upper and lower rings 108, 110 can be formed from other solution-proof materials.

Referring again to FIGS. 5 and 6, the solid chemical form 94 is illustrated. The solid chemical form 94 is configured for insertion into the canister cage 92 and is further configured for measured dissolution into the solution flowing from the pre-canister sensor 56. In the illustrated embodiment, the solid chemical form 94 is formed from a detergent-based, dissolvable material, that includes ingredients such as the non-limiting examples of Benzenesulfonic acid, C10-13-alkyl derivatives, sodium salts and surfactants. It is also contemplated that the solid chemical form 94 includes other ingredients such as the non-limiting examples of scents, soaps, scourers, polishers and the like.

Figure 7:
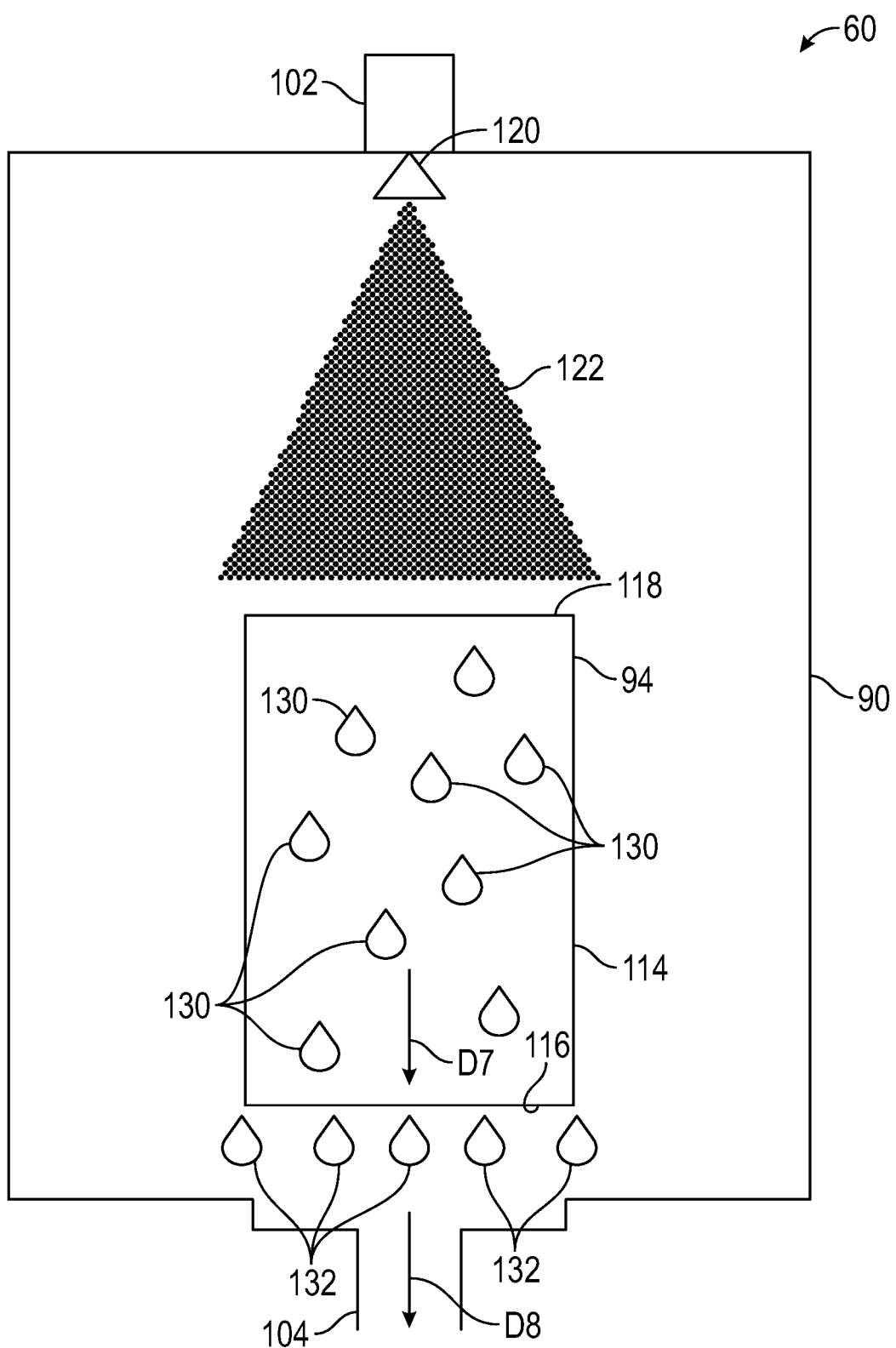
FIG. 7 is a cross-sectional side view of the canister assembly of FIG. 5 illustrating a solid chemical form engaged by a solution mist.

Referring now to FIG. 7, the solid chemical form 94 is shown within the interior of the canister shell 90 (the canister cage 92 is not shown for purposes of clarity). The solid chemical form 94 has the shape of a solid cylinder, with an outer surface 114 bounded by opposing first and second ends 116, 118. However, in other embodiments, the solid chemical form 94 can have other forms, including the form of a hollow cylinder. In still other embodiments, it is contemplated that the solid chemical form 94 can have the shape of a rectangular or square-shaped block, a ball, a pyramid and the like. In still other embodiments, it is contemplated that the solid chemical form 94 can have apertures, perforations, channels and the like configured to facilitate measured dissolution of the solid chemical form 94 into the solution flowing from the pre-canister sensor 56.

Referring now to FIG. 6, the canister assembly 60 is assembled in the following steps. First, the upper cap 98 of the canister shell 90 is removed. Next, the canister cage 92 is removed from the canister shell 90. In a next step, the solid chemical form 94 is insert it the canister cage 92. In a next step, the canister cage 92, with the inserted solid chemical form 94, is placed back into the canister shell 90. Finally, the upper cap 98 is fitted back onto the canister shell 90

Referring again to FIG. 7, the canister shell 90 includes a spray nozzle 120 positioned vertically above the solid chemical form 94 and in fluid communication with the upper port 102. The spray nozzle 120 is configured to receive a flow of the solution flowing through upper port and is further configured to generate a solution mist, shown schematically at 122, directed at the solid chemical form 94.

Referring now to FIGS. 4, 6, and 7, operation of the delivery system 40 will now be described. Referring first to FIG. 6 in an initial operational step, the canister assembly 60 of the floor cleaning machine 10 is equipped with the solid chemical form 94, as described above. Next, the canister assembly 60 is loaded into the floor cleaning machine 10 and fluidly connected to the fifth and sixth hoses 62, 66. In a next step, the solution tank 42 is filled with the solution. As the floor cleaning machine 10 is used, solution from the solution tank 42 flows through the first hose 46 to the valve 44, as depicted by direction arrow D1. Next, the valve 44 is opened, thereby allowing the flow of solution to flow through the second hose 50 to the filter 48, as depicted by direction arrow D2. In a next step, the flow of solution flows through the filter 48 to the solution pump 52 through the third hose 54, as depicted by direction arrow D3. Next, the solution pump 52 pumps the solution through the fourth hose 58 to the pre-canister sensor 56, as depicted by direction arrow D4.

Referring again to FIG. 4 in a next step, the pre-canister sensor 56 measures the total concentration of any dissolved solids within the flow of the solution. The pre-canister sensor 56 communicates the measured values of the dissolved solids with a controller 80 via a first electrical connector 82. The controller 80 will be discussed in more detail below.

Referring again to FIG. 4 in a next step, a first portion of the solution flow is directed from the pre-canister sensor 56 to the canister 60 through the fifth hose 62, as depicted by direction arrow D5, and a second portion of the solution flow is directed from the pre-canister sensor 56 to the sixth hose 66 through the seventh hose 68, as depicted by direction arrow D6. The first and second directed portions of the solution flow are adjustable, to obtain the desired dissolved solids from the solid chemical form 94. In the illustrated embodiment, the first portion of the solution flow is approximately 3.0% of the total volume of the solution flow and the second portion of the solution flow is approximately 97.0% of the total volume of the solution flow. It has been determined that the first portion of the solution flow, at 3.0% of the total volume of the solution flow, optimizes the measured dissolution of the solid chemical form 94. However, it is contemplated that the first portion of the solution flow can be adjusted to optimize the measured dissolution of solid chemical forms having other shapes, chemical characteristics and physical characteristics, as well as solutions having other chemical properties.

Referring now to FIGS. 4 and 7 in next step, the first portion of the solution flow D5 is received by the canister assembly 60. Next, the spray nozzle 120 forms the solution mist 122. In a next step, the solution mist 122 contacts the solid chemical form 94 and a plurality of droplets 130 are formed on the outer circumferential surface 114 of the solid chemical form 94. Next, the formed droplets 130 engage the solid chemical form 94 is a manner such as to dissolve the solid chemical form 94 at a measured rate of dissolution. In a next step, the combination of the solution formed by the droplets 130 and the dissolved solid chemical form 94 forms blended droplets 132. Next, the blended droplets 132 fall along the outer circumferential surface 114 by the force of gravity to the first end 116 of the solid chemical form 94, as depicted by direction arrow D7. Next, the blended droplets 132 fall from the first end 116 and collect in the lower port 104 of the canister shell 90, as depicted by direction arrow D8.

Referring again to FIG. 4, in a next step the flow of blended droplets 132 are conveyed by the sixth hose 66, as depicted by direction arrow D9, to an intersection with the second portion of solution conveyed by the seventh hose 68. Next, the blended droplets 132 and the second portion of solution combine to form a blended solution, which is conveyed to the post-canister sensor 86, as depicted by direction arrow D10.

Referring again to FIG. 4, the post-canister sensor 64 measures the total concentration of any dissolved solids within the flow of the blended solution. The post-canister sensor 64 communicates the measured values of the dissolved solids with the controller 80 via a second electrical connector 82. In a next step, the controller 80 compares the baseline measurements obtained by the pre-canister sensor 56 with the measured values received from the post-canister sensors 64 and determines if the measured values are within a predetermined and desired range. If the measured values are out of the desired range, the controller 80 communicates with an indicator (not shown) positioned on the operation/control panel 28. The indicator alerts the floor cleaning machine user that the measured values are out of the desired range and the floor cleaning machine user replaces a spent solid chemical form 94.

Referring again to FIG. 4, the blended solution is conveyed from the post-canister sensor 64 to the cleaning head 22 by the eighth hose 70, as depicted by direction arrow D11. In a final step, the cleaning head 22 uses the blended solution, containing the dissolved and suspended cleaning material from the solid chemical form 94 to clean a floor surface.

The solid chemical delivery system provides many benefits, although all benefits may not be available in all embodiments. First, the measured dilution of the solid chemical form alleviates the mixing of chemicals exterior to the machine. Second, the dissolution of the solid chemical form within the interior of the floor cleaning machine reduces chemical contact by a machine user. Finally, the chemical formulation solid chemical form is adjustable, thereby increasing the likelihood that an optimal cleaning solution is provided to the cleaning head.

In accordance with the provisions of the patent statutes, the principle and mode of operation of the floor cleaning machine with a solid chemical delivery system have been explained and illustrated in certain embodiments. However, it must be understood that the floor cleaning machine with a solid chemical delivery system may be practiced otherwise than as specifically explained and illustrated without departing from its spirit or scope.

What is claimed is:

1. A floor cleaning machine comprising:
   a cleaning head configured for cleaning a floor surface;
   a solution tank configured as a reservoir for a cleaning solution;
   a pre-canister sensor configured to receive the cleaning solution from the solution tank and further configured to measure a concentration of any dissolved solids within the cleaning solution, thereby creating a baseline measurement;
   a canister assembly configured to receive a first portion of the cleaning solution from the pre-canister sensor and further configured to dissolve portions of a solid chemical form into the first portion of the cleaning solution thereby forming blended droplets, the canister assembly having a spray nozzle positioned vertically above the solid chemical form; and
   a post-canister sensor configured to receive a mixture of a second portion of the cleaning solution from the pre-canister sensor and the blended droplets from the canister assembly, the post-canister sensor configured to measure the concentration of any dissolved solids within the mixture of the second portion of the cleaning solution from the pre-canister sensor and the blended droplets from the canister assembly;
   wherein a comparison of a post-canister measurement from the post-canister sensor and the baseline measurement from the pre-canister sensor outside of a desired range results in replacement of the solid chemical form.

2. The floor cleaning machine of claim 1, wherein the pre-canister sensor has the form of an inline total dissolved solids sensor.

3. The floor cleaning machine of claim 1, wherein the post-canister sensor has the form of an inline total dissolved solids sensor.

4. The floor cleaning machine of claim 1, wherein a controller is configured to configured to receive the measurement of the concentration of any dissolved solids within the cleaning solution from the pre-canister sensor and further configured to receive the post-canister measurement of the concentration of any dissolved solids within the mixture of the second portion of the cleaning solution from the pre-canister sensor and the blended droplets from the canister assembly from the post-canister sensor.

5. The floor cleaning machine of claim 1, wherein the solid chemical form has the shape of a solid cylinder.

6. The floor cleaning machine of claim 1, wherein an indicator is configured to notify a machine operator if a difference between the measurements is outside of the predefined range.

7. A floor cleaning machine comprising:
   a cleaning head configured for cleaning a floor surface;
   a solution tank configured as a reservoir for a cleaning solution;
   a pre-canister sensor configured to receive the cleaning solution from the solution tank and further configured to measure a concentration of any dissolved solids within the cleaning solution;
   a canister assembly configured to receive a first portion of the cleaning solution from the pre-canister sensor and further configured to dissolve portions of a solid chemical form into the first portion of the cleaning solution thereby forming blended droplets, the canister assembly having a spray nozzle positioned vertically above the solid chemical form;
   a post-canister sensor configured to receive a mixture of a second portion of the cleaning solution from the pre-canister sensor and the blended droplets from the canister assembly, the post-canister sensor configured to measure the concentration of any dissolved solids within the mixture of the second portion of the cleaning solution from the pre-canister sensor and the blended droplets from the canister assembly; and
   a controller configured to receive the measurement of the concentration of any dissolved solids within the cleaning solution from the pre-canister sensor and further configured to receive the post-canister measurement of the concentration of any dissolved solids within the mixture of the second portion of the cleaning solution from the pre-canister sensor and the blended droplets from the canister assembly from the post-canister sensor, and wherein the controller is configured to provide notification if a difference in the measurements is outside of a predefined range.

8. The floor cleaning machine of claim 7, wherein the pre-canister sensor has the form of an inline total dissolved solids sensor.

9. The floor cleaning machine of claim 7, wherein the post-canister sensor has the form of an inline total dissolved solids sensor.

10. The floor cleaning machine of claim 7, wherein the solid chemical form includes channels configured to facilitate a dissolution process.

11. The floor cleaning machine of claim 7, wherein the canister assembly includes a solution mist.

12. The floor cleaning machine of claim 11, wherein the solution mist is formed by the spray nozzle in fluid communication with a hose connected to the pre-canister assembly.

13. The floor cleaning machine of claim 7, wherein the first portion of the cleaning solution received by the canister assembly from the pre-canister sensor constitutes 3.0% of the cleaning solution.

\* \* \* \* \*